(12) United States Patent
Xu

(10) Patent No.: US 8,203,707 B2
(45) Date of Patent: Jun. 19, 2012

(54) METHOD AND APPARATUS FOR DISTRIBUTED SENSING UTILIZING OPTICAL SCATTERING IN OPTICAL WAVEGUIDES

(76) Inventor: Wei Xu, Winchester, MA (US)

( * ) Notice: Subject to any disclaimer, the term of this patent is extended or adjusted under 35 U.S.C. 154(b) by 854 days.

(21) Appl. No.: 11/938,781

(22) Filed: Nov. 13, 2007

(65) Prior Publication Data

US 2010/0284000 A1  Nov. 11, 2010

(51) Int. Cl.
*G01J 3/44* (2006.01)
(52) U.S. Cl. ........................................................ 356/301
(58) Field of Classification Search .................. 356/300, 356/301, 72–73; 385/123, 134
See application file for complete search history.

(56) References Cited

U.S. PATENT DOCUMENTS

| | | | | |
|---|---|---|---|---|
| 5,499,313 A | * | 3/1996 | Kleinerman | 385/123 |
| 2003/0202763 A1 | * | 10/2003 | Starodubov | 385/128 |
| 2004/0150818 A1 | * | 8/2004 | Armstrong et al. | 356/301 |
| 2007/0206203 A1 | * | 9/2007 | Trainer | 356/521 |
| 2009/0129721 A1 | * | 5/2009 | Chen et al. | 385/12 |

* cited by examiner

*Primary Examiner* — Tarifur Chowdhury
*Assistant Examiner* — Abdullahi Nur

(57) ABSTRACT

The present invention relates to a method and apparatus for distributed sensing utilizing optical scattering in optical waveguides and reveals two types of the invention. One type of the invention is to characterize optical scattering while actively controlling the temperature of the optical waveguide. The other type of the invention is to characterize optical scattering while strain/stress is induced into the optical waveguide through interaction of the jackets or coatings of the optical waveguide with objects under test. In one embodiment of the invention, the optical scattering based method and apparatus can sense liquid level, liquid distribution, and temperature gradient on ground and in low gravity. Other embodiments of the invention can detect location and concentration of liquid spill and gas leak along pipelines, or measure liquid or gas flow rates. Moreover, the method and apparatus described in the invention have capabilities of sensing multiple physical and chemical parameters using one sensing optical waveguide.

23 Claims, 4 Drawing Sheets

METHOD AND APPARATUS FOR DISTRIBUTED SENSING UTILIZING OPTICAL SCATTERING IN OPTICAL WAVEGUIDES

CROSS REFERENCES

Barnoski, M. K. and Jensen, S. M., "Fiber waveguides: A novel technique for investigating attenuation characteristics", Applied Optics, vol. 15, pp. 2112-2115, 1976

Ghafoori-Shiraz, H. and Okoshi, T., "Fault location in optical fibers using optical frequency domain reflectometry," Journal of Lightwave Technology, vol. 4, pp. 316-322, 1986

Dawn K. Gifford, Steven T. Kreger, Alex K. Sang, Mark E. Froggatt, Roger G. Duncan, Matthew S. Wolfe, and Brian J. Soller, "Swept-wavelength interferometric interrogation of fiber Rayleigh scatter for distributed sensing applications," SPIE Proceedings, vol. 6770, Optics East, Boston, Mass., 2007.

Horiguchi, T. and Tateda, M., "Optical-fiber-attenuation investigation using stimulated Brillouin scattering between a pulse and a continuous wave," Optical Letters, vol. 4, pp. 408-410, 1989

Garus, D., Gogolla, T., Krebber, K., and Schliep, F. "Brillouin optical-fiber frequency-domain analysis for distributed temperature and stain measurements," Journal of Lightwave Technology, vol. 15, pp. 654-662, 1997

Ricardo Feced, Mahmoud Farhadiroushan, Vincent A. Handerek, and Alan J. Rogers, "A high spatial resolution distributed optical fiber sensor for high-temperature measurements," Review of Scientific Instruments, vol. 68, pp. 3772-3776, 1997

FIELD OF THE INVENTION

The present invention generally relates to the field of measurement. More specifically, the present invention, in an exemplary embodiment, relates to distributed measurement of physical and chemical parameters utilizing optical scattering principles. More specifically still, the present invention, in an exemplary embodiment, relates to measurement of one or more parameters, including liquid level, liquid or gas leak, flow rate, chemical composition, temperature, strain, stress, pressure, and vibration in environments that require distributed or continuous measurements where individual or point sensors would be costly.

BACKGROUND OF THE INVENTION

Optical scattering generally refer to Rayleigh scattering, Brillouin scattering and Raman scattering. Rayleigh scattering is an elastic process in an optical waveguide (e.g. optical fiber). Part of the propagating lightwave is scattered by said optical waveguide. But the optical wavelength of the lightwave is not changed in this scattering process. Brillouin and Raman scattering are inelastic optical scattering processes in which part of the photon energy of said propagating lightwave is absorbed by said optical waveguide while the remaining photon energy is re-emitted as scattered lightwave of either lower or higher frequency. The frequency downshifted lightwave is referred to as the Stokes wave and the frequency upshifted lightwave is referred to as the anti-Stokes wave. These scattering processes can be understood as the conversion of an incident photon into a lower-energy scattered photon plus a phonon of vibrational energy or the conversion of an incident photon and a phonon of vibrational energy into a higher-energy scattered photon. The energy and momentum of said incident photon, said scattered photon, and said phonon of vibrational energy are conserved during these scattering processes. Lower-energy acoustical phonons are generated in Brillouin scattering while high-energy optical phonons are generated in Raman scattering. The frequency difference between said incident photon and said scattered photon is typically ~10 GHz for Brillouin scattering and ~10 THz for Raman scattering. Brillouin or Raman scattering can be spontaneous or stimulated (amplified).

Optical scattering phenomena have been widely used for distributed fiber sensing apparatus and systems. Rayleigh scattering has been used to measure attenuation, temperature and strain of said optical waveguide. The scattered Stoke waves in Brillouin or Raman scattering are sensitive to strain and temperature of said optical waveguide and the environments surrounding it. Characteristics of the Stoke waves have been utilized to measure strain and temperature distributions of said optical waveguide. For example, Brillouin frequency shift of the Stoke waves has been widely used in distributed measurements of strain and temperature. Raman ratio of the Stoke waves has been widely employed in distributed temperature sensing. The optical scattering based sensing instrument and systems include Optical Time Domain Reflectometry, Optical Frequency Domain Reflectometry, Brillouin Optical Time Domain Reflectometry, Brillouin Optical Frequency Domain Reflectometry, and Distributed Anti-Stokes Raman Thermometry, etc.

This invention addresses the method and apparatus of optical scattering-based distributed sensing in said optical waveguide while the temperature of said waveguide is actively controlled or while strain/stress is applied to said waveguide through interaction of jackets or coatings of said optical waveguide with objects under test. The invention is applicable to distributed sensing of one or more physical and chemical parameters simultaneously, including liquid level, liquid or gas leak, flow rate, chemical composition, temperature, strain, stress, pressure, and vibration, etc. In contrast to arrays of many individual point sensors, every point of the optical waveguide is equivalent to an individual point sensor. Thus, the invention provides an efficient and cost effective distributed sensing method and apparatus for continuous sensing needs.

SUMMARY OF THE INVENTION

The present invention relates to a method and apparatus for distributed sensing utilizing optical scattering in optical waveguides and reveals two types of the invention. One type of the invention is to characterize optical scattering while actively controlling the optical waveguide's temperature. The other type of the invention is to characterize optical scattering while strain/stress is induced into the optical waveguide through interaction of the jackets or coatings of said optical waveguide with objects under test. In one embodiment of the invention, the optical scattering based method and apparatus can sense liquid level, liquid distribution, and temperature gradient on ground and in low gravity. Other embodiments of the invention can detect location and concentration of liquid spill and gas leak along pipelines, or measure liquid or gas flow rates. Moreover, the method and apparatus described in the invention have capabilities of sensing multiple physical and chemical parameters using one optical waveguide.

DETAILED DESCRIPTION OF THE INVENTION

The present invention reveals two types of distributed sensing methods and apparatuses based on optical scattering characteristics. One type of the method and apparatus is to characterize optical scattering while actively controlling the optical waveguide's temperature. The other type of the method and apparatus is to characterize optical scattering while strain/stress is induced into the optical waveguide through interaction of the jackets or coatings of said optical waveguide with objects under test.

Figure 1:
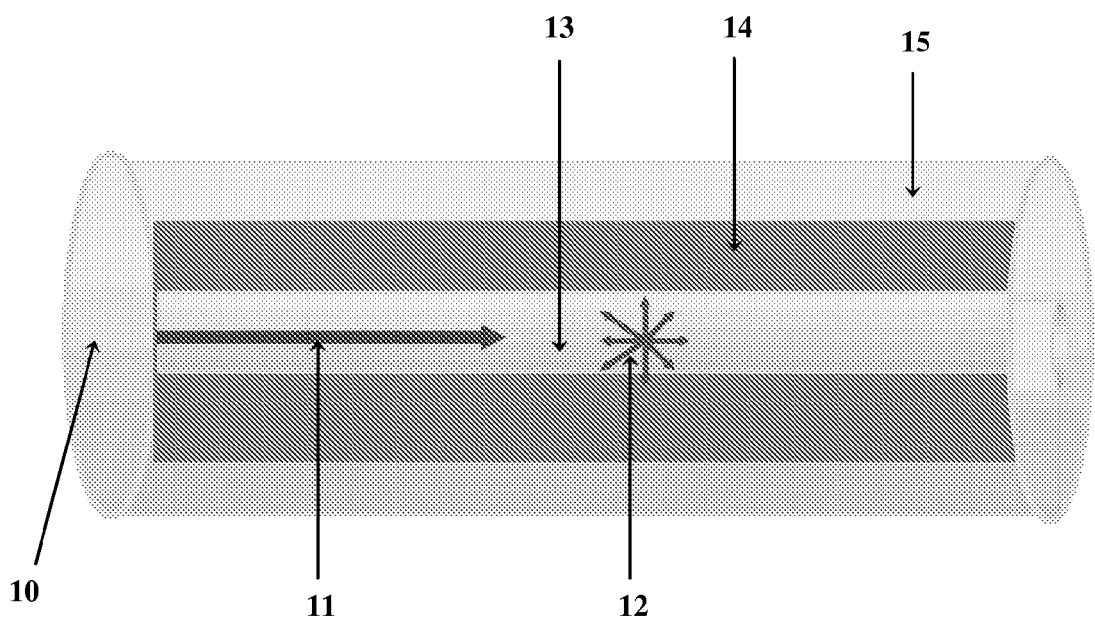
FIG. 1 is a schematic representation of an optical sensing waveguide utilizing optical scattering.

Optical scattering-based temperature distributed sensing methods and apparatuses are widely reported to detect the temperature distribution of said sensing optical waveguide and its surrounding environment. One type of the present invention employs optical scattering-based temperature sensing principle while controlling the temperature of said optical waveguide. This invention can measure not only the temperature distribution but also other physical and chemical parameters. In an exemplary embodiment, this invention can detect liquid level, liquid distribution, and liquid leak. FIG. 1 shows the schematic structure of the sensing optical waveguide 10, whose temperature can by controlled with either optical or electrical heating methods. The optical waveguide consists of but is not limited to core 13, cladding 14, and coating-for-heating 15. Said core and cladding form said optical waveguide 10, where lightwave 11 propagates and optical scattering 12 takes place. Characteristics of the optical scattering, including Rayleigh, Brillouin and Raman scattering, are sensitive to the temperature of said optical waveguide. Said coating-for-heating 15 surrounds said cladding 14 and can be heated by electrical or optical methods. The electrical heating method is that a small amount of electrical current flows along said conductive coating-for-heating 15 to generate heat. The optical heating method is that another lightwave propagates in said cladding 14 and said coating-for-heating 15 absorbs some of the lightwave in said cladding 14 to generate heat. When some part of said optical waveguide is submerged in the liquid under test and the rest of the optical waveguide is outside the liquid, the temperature of these two parts is different because the liquid has heat capacity and thermal conductivity different from the areas without the liquid.

Figure 2:
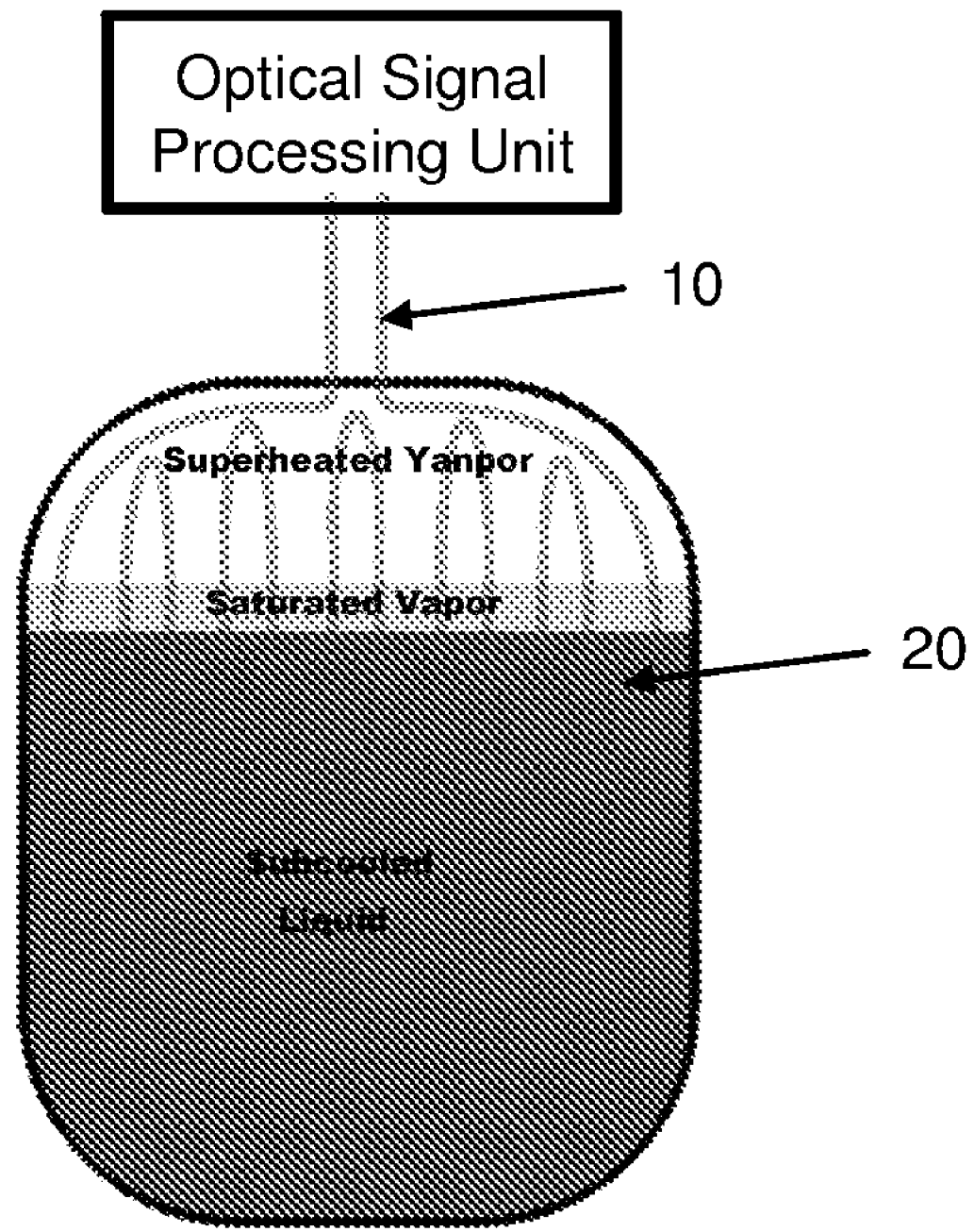
FIG. 2 is a schematic representation of an apparatus of sensing liquid level in a tank on ground.

Here three exemplary embodiments are revealed: liquid level measurement in regular gravity, liquid/vapor distribution measurement in low gravity, oil pipeline leak and chemical spill detection. For space applications, cryogenic liquid level 20 in regular gravity is currently measured by arrays of tens of point semiconductor sensors installed in the liquid tank. Each point sensor requires two or four metal leads to function. This incurs a large number of electric feed-throughts for one cryogenic tank and increases possibility of mechanical and electrical failures. The current invention installs one piece of sensing optical fiber waveguide in the tank with total two feed-throughts for one tank, as illustrated in FIG. 2. The fiber is coated with an electrical conductive coating and can be heated when a small amount of electrical current flows along the coating. Or it is coated with an optical absorption coating and can be heated when a lightwave is guided in the fiber cladding and absorbed by the coating. When some part of the heated optical fiber waveguide is submerged in the cryogenic liquid, the temperature of this part is limited by the boiling point of the liquid. The temperature difference between the submerged fiber parts and the fiber parts outside the liquid as well as their locations can be measured with the prior art distributed optical scattering-based temperature sensing method. Then the liquid level and distribution in the tanks of a space shuttle can be determined.

Figure 3:
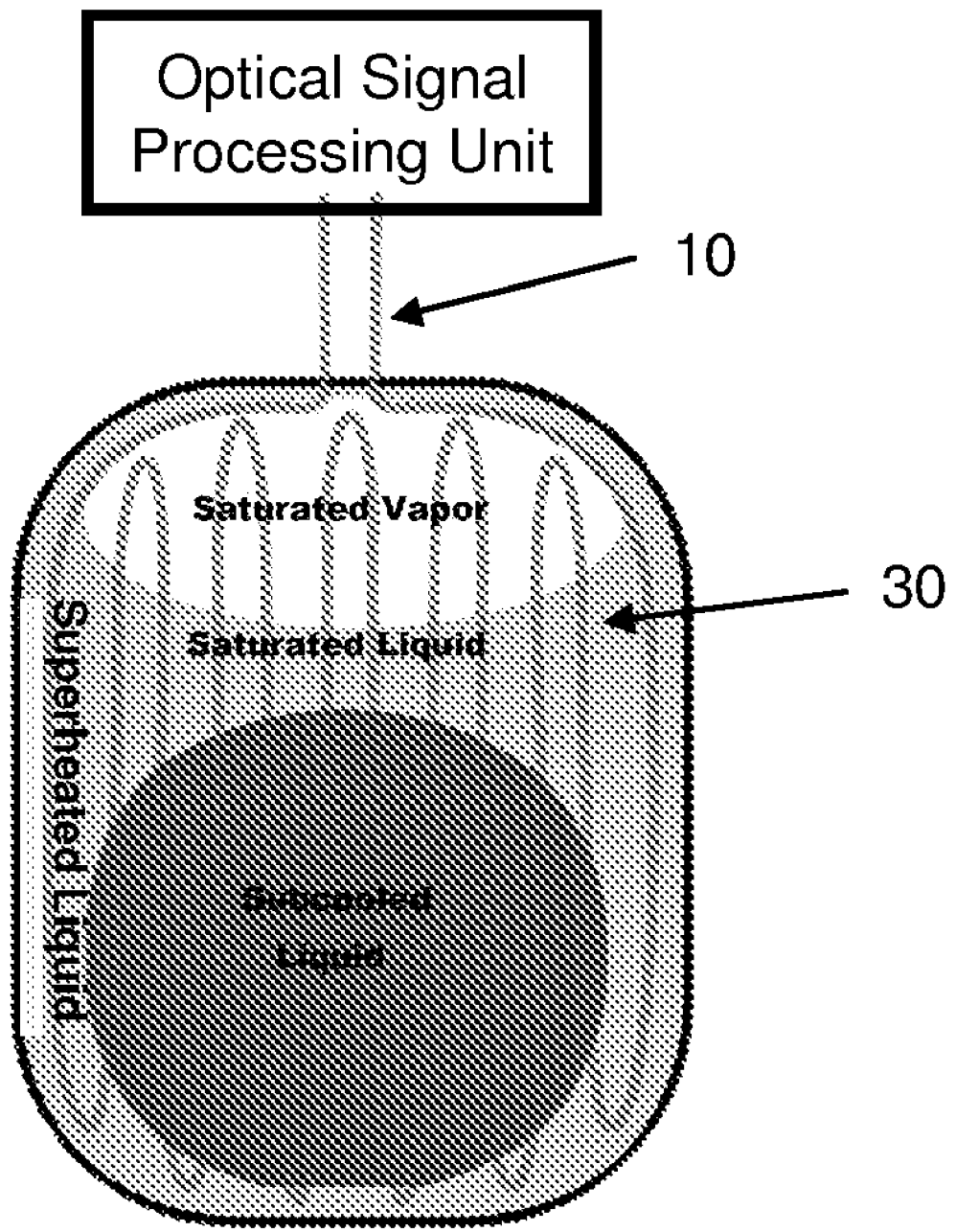
FIG. 3 is a schematic representation of an apparatus of sensing liquid/vapor distribution in a tank in low gravity.

Liquid/vapor distribution measurement in low gravity is essential to various space missions. In low gravity, there is not a clear gravitational orientation of liquid/vapor distribution 30. Surface tension related forces play a significant role in determining fluid distribution. The fluid tends to seek a position which either locally or globally minimizes the area/energy of the free surfaces. Numerous point sensors are needed in order to know liquid/vapor orientation, distribution, and geometry of the liquid/vapor interface(s). Detection of liquid and vapor locations within the tank is critical to key low-gravity operations such as venting for pressure relief and liquid transfer. Without accurate information on the location of liquid and vapor, significant quantities of liquid propellant can be inadvertently vented; large quantities of vapor can be ingested into engine during engine firings; pressurant can be injected directly into the liquid resulting in insufficient pressurization. Any of these scenarios would cause loss of mission. Measurement of thermodynamic conditions in all regions of a cryogenic propellant tank is vital for predicting behaviors of a space system under a variety of operations, including pressure control, ullage collapse, engine feed conditions, active cooling, and explosive boiling. Moreover, determination of the liquid mass remaining in the propellant tank with accuracy of 1% is critical to mission operations. Traditional mass gauging methods are not applicable in low gravity. Knowledge on liquid/vapor orientation and distribution, geometry of the liquid/vapor interface(s), temperature gradients, and liquid density variation are needed to determine the liquid quantity. The present invention can meet these requirements as show in FIG. 3. With total two feed-throughts to connect to the signal processing unit outside the tank, the sensing optical fiber waveguide is mounted on the tank walls and wrapped around any tank internal structure to cover all necessary spaces to be measured. The invention enables every point of the sensing fiber to be a "point sensor" for not only distinguishing liquid and vapor but also measuring their temperature. When the sensing fiber is heated, every fiber point acts as a liquid/vapor discriminator. When the sensing fiber is not heated, every fiber point becomes a temperature sensor. The method calculates and determines the physical location of each "point sensor" with spatial resolution ranging from a few millimeters to tens of centimeters depending on application requirements. Hence, acting as arrays of numerous point liquid/vapor discriminators and temperature sensors, the invention can measure/map liquid/vapor distribution and the temperature distribution in all regions of the tank, which is independent of the tank's motion and/or position with respect to any gravitational field.

Figure 4:
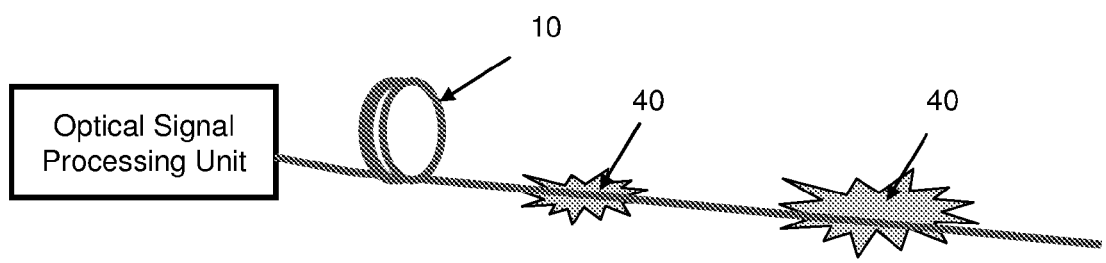
FIG. 4 is a schematic representation of an apparatus of detecting liquid spills.

Another application of this invention is to detect oil pipeline leak and hazardous liquid chemical spill, as shown in FIG. 4. Hazardous liquid spill and oil leak 40 from transportation pipelines and refinery storage facilities result in growing public concerns over environmental protection and natural resource conservation. Moreover, transportation pipelines are located in remote areas of continents or under sea, which are difficult to access to. This invention can rapidly detect presence and location of liquid spill and oil leak and minimize the risk and damage caused. When the sensing fiber waveguide is exposed to the liquid spill and oil leak, the different heat capacity of the liquid or oil causes the temperature of the submerged sensing fiber vary from that of other parts of the sensing fiber without being exposed to the liquid or oil. Then the temperature difference and the event location can be determined by the prior art optical scattering-based temperature sensing methods.

So far one type of the invention, based on actively controlling the temperature of said optical waveguide, has been revealed. The other type of the invention is based on inducing strain and stress into the optical waveguide through interaction of the jackets or coatings of said optical waveguide with objects under test, as illustrated in FIG. 1. In one exemplary embodiment, said optical sensing fiber waveguide 10 is coated with chemical sensitive coatings or jackets 15. When exposed to chemicals, said coatings or jackets 15 interact with chemicals, which cause said coatings or jackets to expand or shrink. Expansion or shrinkage of said coatings or jackets induces strain and stress into said sensing optical fiber waveguide. The applied strain and stress can then be characterized by prior art optical scattering-based distributed strain measurement methods. The present invention reveals a distributed chemical sensing method and apparatus, which can detect the chemical presence, location, and chemical concentration. Two exemplary applications of the invention are introduced here. One is distributed optical fiber hydrogen gas sensor; the other is distributed optical fiber petroleum hydrocarbon sensor. For the hydrogen gas sensor, said optical fiber waveguide is coated with palladium metal or palladium alloys or materials containing palladium. Palladium is capable of absorbing hydrogen by up to 900 times of its own volume. The volumetric expansion of the palladium coating transfers characteristic mechanic strain to the fiber. When said palladium-coated optical fiber waveguide is exposed to hydrogen gas, the hydrogen presence, location and concentration can then be determined with prior art optical scattering-based distributed strain measurement methods. When used as the petroleum hydrocarbon sensor, said optical fiber waveguide is coated with swellable polymers. Upon absorbing hydrocarbon, the polymers expand and induce strain to said optical fiber waveguide. The hydrocarbon presence and location can them be determined by the optical scattering-based distributed strain measurement methods.

What is claimed is:

1. An apparatus for distributed sensing, comprising: an optical fiber waveguide as a sensing element, said optical fiber guide including a heating coating, the temperature of said optical fiber being controlled by at least one of an electrical method and an optical method applied to said heating coating so as to provide a plurality of point sensors along said optical fiber waveguide for the detection of optical scattering; at least one light source operatively in connection with said optical fiber waveguide; at least one light detection device, operatively in connection with said fiber waveguide, for measuring scattered light waves resulting from optical scattering at one or more said point sensors along said optical fiber waveguide; and at least one optical signal processing unit, operatively in connection with said light detection device, for analyzing characteristics of said optical scattering and determining physical or chemical parameters as a function of point sensor position of said optical scattering along said optical fiber waveguide.

2. The method and apparatus according to claim 1 wherein said optical fiber waveguide further comprises:
    a core having a light propagation region along its length; and
    at least one cladding encasing said core for light to propagate in said core.

3. The method and apparatus according to claim 1 wherein said optical fiber waveguide further comprises:
    at least one UV curable or thermal curable coating encasing said optical waveguide to provide said optical fiber waveguide with strength and flexibility.

4. The method and apparatus according to claim 1 wherein said optical fiber waveguide further comprises:
    at least one UV curable or thermal curable coating encasing said optical waveguide to provide said fiber waveguide with strength and flexibility; and
    at least one hermetic coating encasing said fiber waveguide to enhance mechanical strength of said fiber waveguide, wherein said hermetic coating is utilized to heat said fiber waveguide electrically or optically.

5. The method and apparatus according to claim 4 wherein said hermetic coating comprises an electrical conductive or optical absorption material, wherein said hermetic coating can be utilized to heat said optical fiber waveguide electrically or optically.

6. The method and apparatus according to claim 1 wherein said optical fiber waveguide further comprises:
    at least one UV curable or thermal curable coating encasing said optical waveguide to provide said fiber waveguide with strength and flexibility; and
    an electrical wire wrapped around said UV curable or thermal curable coating to heat said fiber waveguide electrically.

7. The method and apparatus of claim 1 wherein said optical fiber waveguide is heated by an electrical method, wherein an electrical current flows along at least one of said heating coating or an electrical wire encasing said optical fiber waveguide.

8. The method and apparatus of claim 1 wherein said optical fiber waveguide is heated by an optical method, wherein an optical lightwave is guided in a cladding of said fiber waveguide, and said heating coating absorbs part of said optical lightwave to heat said optical fiber waveguide.

9. The method and apparatus of claim 1 wherein said optical scattering comprises at least one of Rayleigh scattering, Brillouin scattering, and Raman scattering.

10. The method and apparatus of claim 1 wherein said optical fiber waveguide is disposed in a liquid and vapor distribution on ground or in low gravity so as to measure liquid level.

11. The method and apparatus according to claim 1 wherein said optical fiber waveguide is disposed so as to detect liquid spill and liquid leak.

12. The method and apparatus according to claim 1 wherein said optical fiber waveguide is disposed so as to measure flow rate of liquid and gas.

13. The method and apparatus according to claim 1 wherein said optical fiber waveguide further comprises a metal or a metal alloy coating for sensing presence, location and concentration of hydrogen gas.

14. The method and apparatus of claim 13 wherein said coating is disposed to receive an electrical current or an optical lightwave to enhance and optimize sensitivity of said optical fiber waveguide to hydrogen gas.

15. The method and apparatus according to claim 1 wherein said optical fiber waveguide is disposed to provide multiple sensing functions.

16. An apparatus for distributed sensing, comprising: at least one light source; an optical fiber waveguide operatively in connection with at least one light source, wherein optical scattering said at least one light source takes place while strain/stress is introduced into the optical waveguide through interaction of a coating of said optical waveguide with objects under test so as to provide a plurality of point sensors along said optical fiber waveguide for the detection of optical scattering; said optical scattering including at least one of Rayleigh scattering of said at least one light source, Brillouin scattering of said at least one light source, and Raman scattering of said at least one light source; at least one light detection device, operatively in connection with said fiber waveguide, for measuring scattered light waves resulting from optical scattering at one or more said point sensors along said optical fiber waveguide; and at least one optical signal processing unit, operatively in connection with said light detection device, for analyzing characteristics of said optical scattering and determining physical or chemical parameters as a function of point sensor position of said optical scattering along said optical fiber waveguide.

17. The method and apparatus according to claim 1 wherein said optical fiber waveguide further comprises:
at least one coating encasing said fiber waveguide, wherein said coating interacts with the object under test and induces stain/stress to said optical fiber waveguide.

18. The method and apparatus as in any one of claim 17, wherein said optical fiber waveguide further comprises at least one adhesive layer to adhere said coating, which interacts with the object under test.

19. The method and apparatus as in any one of claim 17, wherein said optical fiber waveguide is further encased by at least one protection jacket comprising a plurality of holes to form a meshed jacket, providing said optical waveguide with mechanic strength and integrity while the objects under test can still diffuse through said protection jacket to interact with said coating.

20. The method and apparatus according to claim 1 wherein said optical fiber waveguide further comprises:
at least one coating encasing said optical fiber waveguide, wherein said coating interacts with the object under test and induces stain/stress to said fiber waveguide; and
at least one UV curable or thermal curable coating encasing said optical fiber waveguide to provide said fiber waveguide with strength and mechanic integrity.

21. The method and apparatus according to claim 17 wherein said optical fiber waveguide further comprises:
at least one coating encasing said fiber waveguide, wherein said coating interacts with the object under test and induces stain/stress to said fiber waveguide,
at least one UV curable or thermal curable coating encasing said fiber waveguide to provide said fiber waveguide with strength and mechanic integrity,
at least one hermetic coating encasing said fiber waveguide to enhance mechanical strength of said fiber waveguide.

22. The method and apparatus of claim 16 wherein said optical fiber waveguide is disposed so as to detect the presence of leaking gas.

23. The method and apparatus according to claim 16 wherein said optical fiber waveguide is disposed about a possible leak location so as to detect hydrogen plume flow.

* * * * *